Nov. 1, 1927.

R. C. SCHOTT ET AL 1,647,316

DEMAND LIMITING RELAY

Filed Sept. 23, 1924

WITNESSES:

INVENTORS
Robert Carl Schott and
Alfred J. A. Peterson.
BY

ATTORNEY

Patented Nov. 1, 1927.

1,647,316

UNITED STATES PATENT OFFICE.

ROBERT C. SCHOTT, OF BROOKLYN, NEW YORK, AND ALFRED J. A. PETERSON, OF WILKINSBURG, PENNSYLVANIA, ASSIGNORS TO WESTINGHOUSE ELECTRIC & MANUFACTURING COMPANY, A CORPORATION OF PENNSYLVANIA.

DEMAND-LIMITING RELAY.

Application filed September 23, 1924. Serial No. 739,281.

Our invention relates to electrical protective devices and particularly to demand-limiting relays.

One object of our invention is to provide an electrical system that shall be rendered inoperative after it has delivered a predetermined amount of energy in a given period.

Another object of our invention is to provide a system of electrical distribution that shall be rendered inoperative whenever a perdetermined amount of energy has been delivered within a given time interval and that shall be restored to service at the beginning of the next time interval.

In certain classes of electrical service, it has been found most equitable to base charges for power service upon a demand basis. In such systems, the rate is based upon a maximum demand in any given period of time, and the customer is charged in accordance with such demand rating regardless of whether or not the rated amount of energy is actually consumed in any given time period. In such systems, it is customary to penalize the customer for any excess over the predetermined rating taken by the customer in any given time interval.

Our invention accomplishes the foregoing results by disconnecting the customer's service or a portion thereof when the predetermined energy demand is exceeded in any time interval and restores the service at the beginning of the subsequent time interval.

Figure 1:
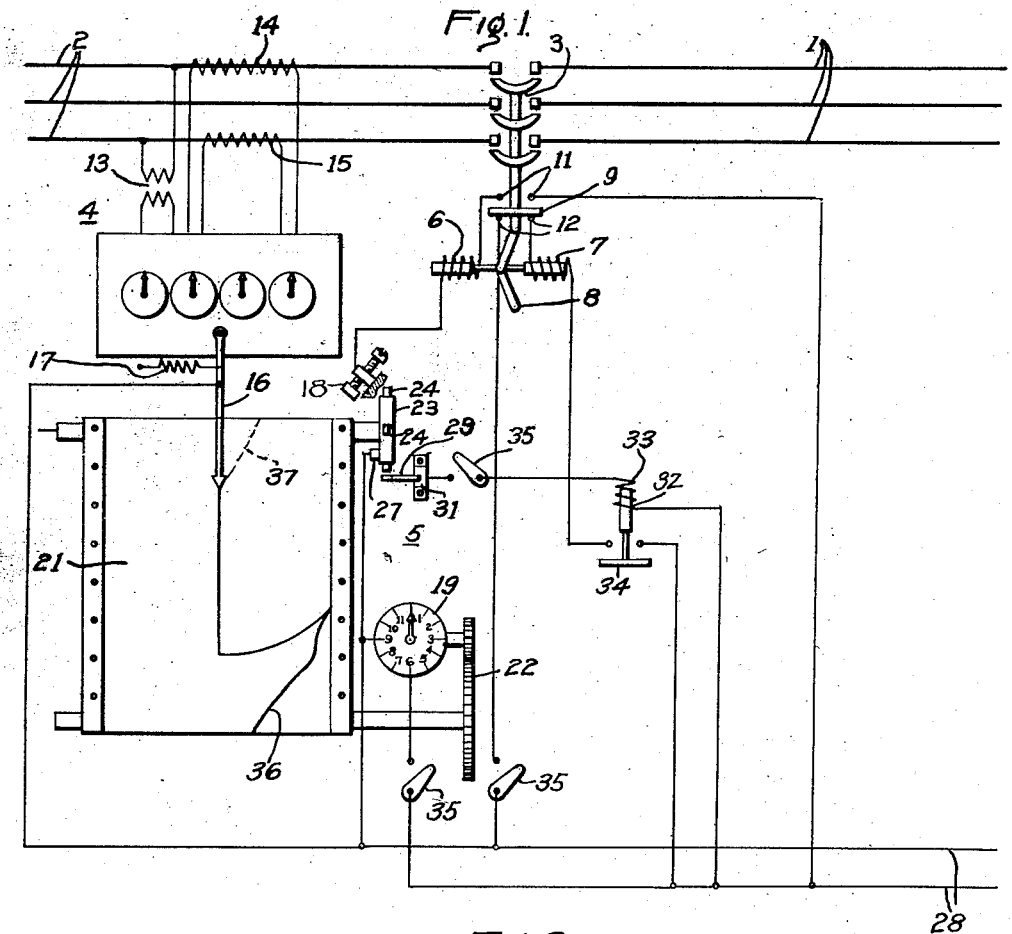
Figure 2:
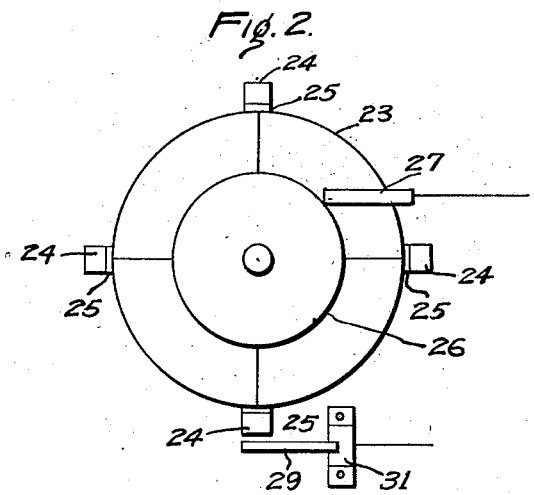

In the accompanying drawing,

Figure 1 is a diagrammatic view of circuits and apparatus embodying our invention, and Fig. 2 is an enlarged view, in elevation, of a detail of our invention.

Our invention comprises, in general, a supply circuit 1 that delivers energy to a feeder circuit through a circuit interrupter 3, a demand meter 4 connected to the circuit 2, and a clock driven device 5 for controlling the trip coil 6 and the closing coil 7 of the circuit interrupter 3 in accordance with the power demand of the circuit 2.

The circuit interrupter 3 may be of any desired type having the tripping coil 6 and the closing coil 7, together with a suitable toggle mechanism 8 for transmitting motion from the coils 6 and 7. A double-contact auxiliary switch 9 is mounted on the circuit interrupter 3 for co-operation with pairs of stationary contact members 11 and 12.

The demand meter 4 may be of any suitable type and is connected, through a potential transformer 13 and current transformers 14 and 15, to the circuit 2. The demand meter 4 is provided with a pointer 16 that is actuated in accordance with the demand registered by the meter 4 at any given time. The pointer 16 preferably is in the form of a pen or stylus for a purpose hereinafter described. A coil spring 17 is secured to the pointer 16 in order to return the pointer to an initial position whenever the meter 4 becomes de-energized. The pointer 16, in addition to serving as a stylus, also serves as a movable contact member for co-operation with an adjustable contact member 18 that is connected in circuit with the tripping coil 6.

The clock-driven device 5 comprises a clock 19 that may be motor driven, if desired, a chart 21 that is driven through a gear train 22 by the clock 19, and an intermittent contactor 23 that is also driven by the clock 19 through the chart 21. If desired, however, the contactor 23 may be directly driven by the clock 19.

Referring to Fig. 2, the intermittent contactor 23 comprises a plurality of contact members 24 that resemble the points on a star-wheel and are insulated from one another by suitable insulating material 25. Within the contactor 23 a conducting ring 26 is provided to which the contact members 24 are electrically connected. The conductor 26 is in sliding contact with a brush 27 that is connected to one of the conductors of a direct-current supply circuit 28.

We have shown the contact members 24 disposed substantially ninety degrees from each other around the periphery of the contactor 23. It is to be understood, however, that the arrangement of the several contact members 24 may be varied in accordance with the number desired and in accordance with the speed of rotation of the contactor 23 and in accordance with the period of the demand, etc.

A brush 29, carried by a binding post 31, is disposed at any desired position relative to the contactor 23 such that engagement is made therewith by each of the contact members 24 during a complete revolution of the contactor 23.

A relay 32, having a winding 33 and co-operating contact members 34, is placed in circuit between one of the conductors of the circuit 28 and the terminal 31 for completing the circuit of the closing coil 7. Suitable service switches 35 are provided for the purpose of rendering the relay 32, tripping coil 6 and clock 19 electrically de-energized, if desired.

The double contact auxiliary switch 9, when in engagement with the stationary contact members 11, completes a circuit between the tripping coil 6 and one of the conductors of the circuit 28 and, when in engagement with the stationary contact members 12, it completes a circuit between one of the conductors of the circuit 28 through the contact members 34 of the relay 33 and the closing coil 7.

In the operation of our demand relay, at the beginning of the time interval, the several parts of the system are in the positions shown in Fig. 1, except that the several switches 35 are in their closed positions. In these several positions, the clock 19 drives the chart 21 and, consequently, the contactor 23. Whenever any one of the contact members 24 engages the brush 29, a circuit is completed that extends from one of the conductors of the circuit 28 through the brush 27, the contact member 24, the conductor 26, the brush 29, the terminal 31, the service switch 35, and the winding 33 of the relay 32 to the other conductor of the circuit 28. The contact members 34 of the relay 32 are thereupon engaged.

Upon engagement of the contact members 34, a circuit is completed from one of the conductors of the circuit 28 through the service switch 35, the contact switch 9, the stationary contact members 12, the closing coil 7 and the contact members 34 to the other conductor of the circuit 28. The circuit interrupter 3 is thereupon actuated to its circuit-closing position, and the circuit 2 is energized, whereupon the demand meter 4 begins to record the power transmitted by the circuit 2.

As the meter 4 continues to be energized, it integrates the power supplied by the circuit 2 and causes the pointer or stylus 16 to move in a counter-clockwise direction across the chart 21 and against the bias of spring 17. Movement of the pointer 16 across the chart 21 causes the stylus to draw curves on the chart 21 which are shown at 36 and 37.

When the pointer 16 reaches the right-hand edge of the chart 21 or any desired position in which the contact member 18 is placed, it engages the stationary contact member 18. A circuit is thereupon completed between one of the conductors of the circuit 28 through the pointer 16, stationary contact member 18, tripping coil 6, contact member 9, and stationary contact members 11 to the other conductor of the circuit 28, whereupon the circuit interrupter 3 is actuated to its circuit opening position. The meter 4 is de-energized upon the opening of the circuit interrupter 3, and the pointer 16 is returned to its zero or inoperative position by action of the spring 17. The pointer 16 remains in this position until the end of the time period, whereupon another contact member 24 engages the brush 29, and the circuit interrupter 3 is again closed in accordance with the foregoing cycle of operations.

In the event that the energy consumed in the circuit 2, during any time interval, does not exceed the rated demand, the completion of a circuit at the contact member 24 and the brush 29 produces no undesirable effect for the reason that, upon the energization of the relay 32, the closing coil 7 is biased to its circuit-closing position, but, since the circuit interrupter 3 is already in its closed position, no mechanical movement takes place as a result of the current that momentarily traverses the closing coil 7. The current traversing the closing coil 7 is not of sufficient duration to endanger the coil by overheating. The pointer 16 returns to its initial position at the end of each period.

The foregoing cycle of operations may be continued indefinitely and automatically so long as the supply circuit 28 is energized.

By means of our demand limiting relay, we are enabled to control the amount of energy consumed by an electrical circuit in any given period of time and to restore that electrical circuit at the beginning of each subsequent time interval thereby automatically insuring that the customer will not increase the current taken by his equipment in any time interval.

We do not wish to be restricted to the specific circuit connections or arrangement of parts herein set forth, as various modifications thereof may be effected without departing from the spirit and scope of our invention. We desire, therefore, that only such limitations shall be imposed as are indicated in the appended claims.

We claim as our invention:

1. In an electrical system, the combination with an electrical circuit, a circuit interrupter therein and means for operating the circuit interrupter, of a chart, means for integrating the power transmitted by said circuit and recording the same on said chart, means actuated by the integrating means for controlling an operation of the operating means, and a timing element driving the chart and co-operating with the integrating means for controlling another operation of the operating means.

2. In an electrical system, the combination with an electrical circuit, a circuit interrupter therein, a closing coil and a tripping coil for the circuit interrupter, of means for integrating the power transmitted by said circuit, means actuated by the integrating means for controlling the tripping coil, and a timing element co-operating with the integrating means for controlling the closing coil.

3. In an electrical system, the combination with an electrical circuit, a circuit interrupter therein, a closing coil and a tripping coil for the circuit interrupter, of means for integrating the power transmitted by said circuit, means actuated by the integrating means for controlling the tripping coil, and a timing element co-operating with the integrating means for controlling the closing coil at predetermined intervals of time.

4. In an electrical system, the combination with an electrical circuit, a circuit interrupter therein, a closing coil and a tripping coil for the circuit interrupter, of means for integrating the power transmitted by said circuit, a stylus actuated thereby and constituting a contact member, a clock, a chart driven by the clock and co-operating with the stylus, a contact member for co-operation with the stylus at a point in its movement, the stylus and contact member co-operating to control the tripping coil, and means actuated by the clock and co-operating with the chart for energizing the closing coil at predetermined intervals of time.

5. In an electrical system, the combination with an electrical circuit, a circuit interrupter therein, a closing coil and a tripping coil for the circuit interrupter, of means for integrating the power transmitted by said circuit, a stylus actuated thereby and constituting a contact member, a clock, a chart driven by the clock and co-operating with the stylus, a contact member for co-operation with the stylus to control the tripping coil, and means actuated by the clock and co-operating with the chart for energizing the closing coil at predetermined intervals of time, whereby the circuit interrupter is moved to its open position when the integrating means records a predetermined quantity, and the circuit interrupter is biased to its closed position at regular intervals of time.

In testimony whereof, I have hereunto subscribed my name this 11th day of August, 1924.

ROBERT C. SCHOTT.

In testimony whereof, I have hereunto subscribed my name this 17th day of September, 1924.

ALFRED J. A. PETERSON.